(12) United States Patent
Kahlen et al.

(10) Patent No.: US 11,345,804 B2
(45) Date of Patent: May 31, 2022

(54) USE OF A POLYMER COMPOSITION FOR THE PRODUCTION OF ARTICLES WITH IMPROVED PAINTABILITY AND SURFACE APPEARANCE

(71) Applicant: Borealis AG, Vienna (AT)

(72) Inventors: Susanne Kahlen, Linz (AT); Claudia Kniesel, Linz (AT); Thomas Lummerstorfer, Gramastetten (AT); Daniela Mileva, Pichling (AT); Milorad Bogdanovic, Linz (AT)

(73) Assignee: Borealis AG, Vienna (AT)

( * ) Notice: Subject to any disclaimer, the term of this patent is extended or adjusted under 35 U.S.C. 154(b) by 207 days.

(21) Appl. No.: 16/479,027

(22) PCT Filed: Jan. 30, 2018

(86) PCT No.: PCT/EP2018/052193
§ 371 (c)(1),
(2) Date: Jul. 26, 2019

(87) PCT Pub. No.: WO2018/141704
PCT Pub. Date: Aug. 9, 2018

(65) Prior Publication Data
US 2019/0382570 A1 Dec. 19, 2019

(30) Foreign Application Priority Data

Feb. 3, 2017 (EP) .................................. 17154520

(51) Int. Cl.
*C08L 23/14* (2006.01)
*C08K 3/013* (2018.01)
*C08K 3/36* (2006.01)

(52) U.S. Cl.
CPC ............ *C08L 23/142* (2013.01); *C08K 3/013* (2018.01); *C08K 3/36* (2013.01); *C08L 2205/025* (2013.01); *C08L 2207/02* (2013.01)

(58) Field of Classification Search
CPC .... C08L 2207/02; C08L 23/142; C08K 3/013
See application file for complete search history.

(56) References Cited

U.S. PATENT DOCUMENTS

| | | | |
|---|---|---|---|
| 9,388,304 B2 | 7/2016 | Tranninger et al. | |
| 2004/0259990 A1* | 12/2004 | Sonnenschein | C08J 7/046 524/236 |
| 2013/0317160 A1* | 11/2013 | Posch | C08F 210/06 524/445 |
| 2015/0299443 A1* | 10/2015 | Tranninger | C08F 210/06 524/528 |
| 2017/0029609 A1* | 2/2017 | Grestenberger | C08F 210/06 |
| 2018/0319967 A1* | 11/2018 | Lummerstorfer | C08L 23/12 |

FOREIGN PATENT DOCUMENTS

| | | |
|---|---|---|
| CN | 104884525 A | 9/2015 |
| CN | 110036037 A | 7/2019 |
| EA | 010287 B | 8/2008 |
| EP | 586390 B1 | 3/1994 |
| EP | 591224 B1 | 4/1994 |
| EP | 0887379 A1 | 12/1998 |
| EP | 1028984 B1 | 8/2000 |
| EP | 1183307 B1 | 3/2002 |
| EP | 2666818 A1 | 11/2013 |
| EP | 2787034 A1 | 10/2014 |
| EP | 491566 | 12/2015 |
| EP | 2960256 A1 | 12/2015 |
| JP | 10251465 A | 9/1998 |
| JP | 2000143904 A | 5/2000 |
| RU | 2202571 C2 | 4/2003 |
| RU | 2005133432 A | 2/2006 |
| WO | 9212182 A1 | 7/1992 |
| WO | 9924478 A1 | 5/1999 |
| WO | 9924479 A1 | 5/1999 |
| WO | 0068315 A1 | 11/2000 |
| WO | 2002044272 A1 | 6/2002 |
| WO | 2004000899 A1 | 12/2003 |
| WO | 2004111095 A1 | 12/2004 |
| WO | 2010149529 A1 | 12/2010 |
| WO | 2014083130 A1 | 6/2014 |
| WO | 2015082402 A1 | 6/2015 |
| WO | 2015082403 A1 | 6/2015 |

OTHER PUBLICATIONS

Office Action for Russian Application No. 2019125261/04 dated Jul. 10, 2020, 6 pages.
Search Report for Russian Patent Application No. 2020118022 dated Oct. 10, 2020 and English Translation thereof, 4 pages.
E. A. Karimov et al., Study of Polypropylene Compositions With Fillers and Coronoelectrets Based On Their Basis, UDK 541. 64:678, 4 pages, Saudi Basic Industries Corporation (SA), Dec. 30, 2013.
Office Action for Russian Patent Application No. 2020118022 dated Nov. 5, 2020 and English Translation thereof, 14 pages.
Chum et al. "Structure, Properties and Preparation of Polyolefins Produced by Single-site Catalyst Technology", Metallocene-based Polyolefins, vol. 1, 2000, pp. 262-264.
Sybille Frank et all, in PPS-25 Conf. Polym. Proc. Soc 2009 and Proceedings of the SPIE, vol. 6831, pp. 68130T, 68130T,8 (2008).
Notification of Transmittal of the International Search Report and the Written Opinion of the International Searching Authority or International Application No. PCT/EP2018/052193, dated Mar. 9, 2018, 15 pages.
European Extended Search Report for European Patent Application No. 17154520.5 dated Jun. 30, 2017, 9 pages.
First Office Action for Chinese Patent Application No. 201880008122. 1, dated Jul. 20, 2021, 33 pages.
Fu, Yi et al. "Forming Mechanism and Regulation of Flow Mark of Polypropylene/Elastomer Blending System", Polymer Materials Science and Engineering, vol. 32, No. 5, May 2016, 5 pages, English Abstract attached.

\* cited by examiner

*Primary Examiner* — Jeffrey C Mullis
(74) *Attorney, Agent, or Firm* — Lowenstein Sandler LLP

(57) ABSTRACT

The present invention is directed to the use of a polypropylene composition comprising at least one heterophasic polypropylene and a filler for the production of at least partially painted articles which show both a good paintability and a good surface appearance; and the painted articles produced therefrom. Further the invention is directed to a polypropylene composition showing improved surface appearance and paintability.

20 Claims, No Drawings

USE OF A POLYMER COMPOSITION FOR THE PRODUCTION OF ARTICLES WITH IMPROVED PAINTABILITY AND SURFACE APPEARANCE

CROSS-REFERENCE TO RELATED APPLICATION(S)

The present application is a national phase entry under 35 U.S.C. § 371 of International Application No. PCT/EP2018/052193, filed on Jan. 30, 2018, which claims the benefit of European Patent Application No. 17154520.5, filed on Feb. 3, 2017.

The present invention is directed to the use of a polypropylene composition comprising at least one heterophasic polypropylene and a filler for the production of at least partially painted articles which show both a good paintability and a good surface appearance; and the painted articles produced therefrom.

Further the invention is directed to a polypropylene composition showing improved surface appearance and paintability.

In the field of automotive applications, polyolefins such as polypropylenes are the material of choice as they can be tailored to specific purposes needed. For instance, heterophasic polypropylenes are widely used in the automobile industry (for instance in bumper applications) as they combine good stiffness with reasonable impact strength behaviour. Heterophasic polypropylenes contain a polypropylene matrix in which an amorphous phase is dispersed. The amorphous phase contains a plastomer; like a linear low density polyethylene (LLDPE), or a propylene copolymer rubber, like an ethylene propylene rubber (EPR) or an ethylene propylene diene monomer polymer (EPDM). In the case of propylene copolymer rubber the heterophasic polypropylene may contain additionally a crystalline polyethylene to some extent.

The surface of polyolefins is rather smooth and the polarity rather low resulting in unfavourable prerequisites for interactions with a coating material. As the majority of exterior automotive parts like e.g. bumpers, fenders and body panels are painted, a pretreatment as well as the application of an adhesion promoting layer (a so called primer) is typically used to ensure proper paint adhesion. However, due to environmental reasons it is desired to reduce the use of primers to a minimum or to avoid the use of primers at all that is to change from the so-called 3-layer-paint system to a primerless 2-layer-paint system. There are polypropylenes available in the prior art which show a good paint adhesion and are therefore suitable for primerless systems.

Moreover for unpainted exterior and interior automotive applications an excellent surface appearance of the polypropylene composites is of essential importance for nearly all visible parts. One common problem is flow marks, commonly referred to as "tiger stripes", i.e. alternating glossy and hazy sections on the surface of injection moulded and unpainted parts which are essentially deteriorating the surface quality of those parts. There are polypropylenes available in the prior art which show a good tiger stripe performance and are thus suitable for unpainted automotive applications.

WO 2015/082402 discloses a polypropylene composition having a defined combination of a propylene copolymer having a comonomer content in the range of 1.5 to 8.0 wt % and a melt flow rate MFR$_2$ (230° C.) in the range of 5.0 to 100.0 g/10 min, and 20.0 to 40.0 wt.-%, based on the total weight of the composition, of a mineral filler being selected from the group consisting of talcum, wollastonite, caolin and mica, wherein the polypropylene composition has a melt flow rate MFR$_2$ (230° C.) in the range of 5.0 to 45.0 g/10 min. With this polypropylene composition there can be produced moulded articles having a good stiffness/impact balance and high paint adhesion even without the use of primers. The disclosure is also concerning an article comprising the polypropylene composition. The document does not disclose the use of a composition defined in the present invention for the production of painted articles and is completely silent on the surface appearance.

WO 2015/082403 discloses a polypropylene composition comprising a heterophasic propylene copolymer (HECO) having a melt flow rate MFR$_2$ (230° C.) in the range of above 1.0 to 20.0 g/10 min, an intrinsic viscosity (IV) of the xylene cold soluble (XCS) fraction determined in Decalin at 135° C. in the range of 2.1 to 9.0 dl/g and a comonomer content of the xylene cold soluble (XCS) fraction in the range of 10.0 to 45.0 wt %; a propylene copolymer having a comonomer content in the range of 1.5 to 8.0 wt % and a melt flow rate MFR$_2$ (230° C.) in the range of 5.0 to 100.0 g/10 min; and a mineral filler. An article comprising the composition is also disclosed. The document does not disclose the use of a composition defined in the present invention for the production of painted articles and is completely silent on the surface appearance.

Therefore depending on the targeted application in the prior art a specially "tailor-made" polypropylene material has been used in the past. For articles to be painted of course good paintability properties of the material where essential whereas good surface properties where not required. On the other hand, if the final article remained unpainted, but visible, a perfect surface appearance with low tiger stripe defects of the polypropylene material was desired whereas good interaction with a coating material was not required.

There is however a tendency in the automotive industry in addition to produce completely painted articles to produce also articles which are partially painted with some parts of the article remaining unpainted. The production of such articles enable faster production processes, energy savings and thus enhanced environmental safety and would therefore be highly cost-efficient. The material used for such articles must of course show both good surface properties and good paint adhesion at the same time. For the use of the articles in the demanding area of automotive applications they must additionally have the required mechanical properties.

Thus, the object of the present invention is to provide at least partially painted articles which show the mentioned advantages.

The finding of the present invention is to use a polypropylene composition comprising at least one heterophasic polypropylene and a filler with the composition having a defined intrinsic viscosity (IV) and xylene cold soluble (XCS) features.

Accordingly the present invention is directed to the use of a polypropylene composition comprising
(A) a heterophasic polypropylene having a xylene cold soluble fraction (XCS) of ≥10.0 wt % and an intrinsic viscosity (IV) of the xylene cold soluble (XCS) fraction of >2.0 dl/g
and/or
(B) a heterophasic polypropylene having an intrinsic viscosity (IV) of (XCS) >4.0 dl/g, and
(C) a filler
with the polypropylene composition having an intrinsic viscosity (IV) of (XCS) of ≥3.0 dl/g and a ratio of intrinsic viscosity (IV) of (XCS)/xylene cold soluble fraction (XCS) of ≥0.113 dl/g
for the production of at least partially painted articles.

As the defined polypropylene composition has both good paintability and good surface properties and at the same time shows excellent mechanical behaviour it is possible to use it for manifold applications for example in the automotive area. This in turn allows for very efficient manufacturing processes for many different types of at least partially painted articles with several application options.

In one embodiment the polypropylene composition for use according to the invention is comprising (A) a heterophasic polypropylene having a xylene cold soluble fraction (XCS) of ≥10.0 wt % and an intrinsic viscosity (IV) of (XCS) of >2.0 dl/g and a filler but is not comprising component (B). Thus in this embodiment component (A) is the main polymer component of the heterophasic polypropylene composition used according to the present invention.

In a second embodiment the polypropylene composition for use according to the invention is comprising (B) a heterophasic polypropylene having an intrinsic viscosity (IV) of (XCS) of ≥4.0 dl/g and a filler but is not comprising component (A). Thus in this embodiment component (B) is the main polymer component of the heterophasic polypropylene composition used according to the present invention.

A preferred material for use as a heterophasic polypropylene component (B) in the present invention is the one disclosed as a tiger stripe modifier in WO 2014/083130 A1.

In a third embodiment the polypropylene composition for use according to the invention is comprising (A) a heterophasic polypropylene having a xylene cold soluble (XCS) fraction of ≥10.0% and an intrinsic viscosity (IV) of (XCS) >2.0 dl/g, (B) a heterophasic polypropylene having an intrinsic viscosity (IV) of (XCS) >4.0 dl/g and (C) a filler. Thus in this embodiment both components (A) and (B) are present in the polypropylene composition used according to the present invention.

Within the meaning of the present invention polymer components (A) and (B) are different to each other which means that they differ in at least one of the properties xylene cold soluble fraction (XCS) and/or intrinsic viscosity (IV) of (XCS).

Embodiments where the polypropylene composition used in the present invention comprises both polymer components (A) and (B) are preferred.

Within the meaning of the present invention it is possible that different types of component (A) and/or different types of component (B) are present in the polypropylene composition used in the present invention so that the polypropylene composition is comprising more than one component (A) and/or more than one component (B). In such a case all the different components (A) and/or (B) fulfil the characteristics regarding the xylene cold soluble fraction (XCS) and the intrinsic viscosity (IV) of the xylene cold soluble fraction (XCS) which are specified in claim 1 but at the same time differ from the other components (A) or components (B) respectively, with regard to at least one of those characteristics.

In such cases where different types of component (A) and/or different types of component (B) are present, the amount in wt % of component (A) and/or (B) refers to the total amount of all types of component (A) and/or (B) present in the polypropylene composition used in the invention.

According to a preferred embodiment the polypropylene composition used in the present invention comprises both polymer components (A) and (B) and whereupon it comprises at least two different types of component (A).

For embodiments comprising component (A) it is preferred that component (A) is present in the polypropylene composition in an amount of 35 to 90 wt % based on the total weight of the polypropylene composition. Especially preferred are amounts of component (A) of 35 to 70 wt %, like for example amounts of 35 to 50 wt %.

It is also possible that in addition to component (A) and/or component (B) further heterophasic polypropylene compounds or further propylene homopolymers are present in the polypropylene composition used in the present invention. It is possible that such polymer compounds have an intrinsic viscosity (IV) of XCS of <2 dl/g. However it is preferred that such polymers with an intrinsic viscosity (IV) of XCS of <2 dl/g are present in amounts of <20 wt % based on the total weight of the polypropylene composition. This is especially important for embodiments where only component (A) but no component (B) is present, as with higher amounts of polymers with low intrinsic viscosity (IV) of (XCS) the surface appearance properties tend to deteriorate.

Thus in a preferred embodiment the amount of component (A) in the polypropylene composition used in the present invention is >70 wt %, more preferably >80 wt %, especially preferred >85 wt % based on the total weight of the polypropylene composition with component (B) not being present in the polypropylene composition.

For embodiments comprising component (B) it is preferred that component (B) is present in the polypropylene composition in an amount of 10 to 90 wt % based on the total weight of the polypropylene composition. Especially preferred are amounts of component (B) of 10 to 40 wt %, like for example amounts of 15 to 25 wt %.

In a preferred embodiment the amount of component (B) in the polypropylene composition used in the present invention is >70 wt %, more preferably >80 wt %, especially preferred >85 wt % based on the total weight of the polypropylene composition with component (A) not being present in the polypropylene composition.

According to an equally preferred embodiment the polypropylene composition for use in the present invention comprises from 40 to 80 wt %, preferably from 50 to 70 wt % of component (A) and from 10 to 50 wt %, preferably from 20 to 40 wt % of component (B).

It is preferred that the polypropylene composition used in the present invention comprises not more than 10.0 wt %, more preferably not more than 5.0 wt %, like not more than 2.0 wt %, based on the total weight of the polypropylene composition, of polymers used as carrier for suitable additives.

It is one specific requirement that the polymer composition used in the present invention comprises the filler (C). Preferably component (C) is present in an amount from 5 to 25 wt %, more preferably in an amount from 10 to 20 wt % based on the total weight of the polypropylene composition.

The polypropylene composition used in the present invention may contain up to 5.0 wt % additives excluding the mineral filler as defined in detail below; like antioxidants, slip agents and antiblocking agents. Preferably, the total content of additives in the polypropylene composition used in the invention is below 5.0 wt %, like below 4.0 wt %, based on the total weight of the polypropylene composition.

Suitable additives are well known in the art and can be found for example in the "Additives for Plastics" Handbook, J. Murphy, Elsevier, $2^{nd}$ edition, 2001.

As stated above it is a special advantage of the produced articles that both surface properties and paintability properties are excellent. In order to make full use of this advantage it is preferred that the polypropylene compositions defined in the present invention are used for the production of partially painted articles.

Therefore there are embodiments preferred where a polypropylene composition comprising mainly component (A)

or comprising mainly component (B) or comprising both components (A) and (B) as polymer components is used for the production of partially painted articles.

Alternatively a polypropylene composition comprising mainly component (A) or comprising mainly component (B) or comprising both components (A) and (B) as polymer components is used for the production of fully painted articles.

The polypropylene composition used in the present invention has an intrinsic viscosity (IV) of (XCS) of ≥3.0 dl/g and a ratio of intrinsic viscosity (IV) of (XCS)/xylene cold soluble fraction (XCS) of ≥0.113 dl/g According to a preferred embodiment the polypropylene composition used in the present invention has an intrinsic viscosity (IV) of (XCS) in the range of 3.3 dl/g to 6.0 dl/g. In a further preferred embodiment the intrinsic viscosity (IV) of (XCS) is in the range of 3.5 dl/g to 4.5 dl/g. In an especially preferred embodiment the intrinsic viscosity (IV) of (XCS) of the polypropylene composition is ≥3.7 dl/g, like for example ≥4.0 dl/g.

According to another preferred embodiment the polypropylene composition used in the present invention has a ratio of intrinsic viscosity (IV) of (XCS)/xylene cold soluble fraction (XCS) of ≥0.119 dl/g, more preferably of ≥0.123 dl/g, still more preferably of ≥0.136 dl/g, as for example of ≥0.18 dl/g.

Typically the polypropylene composition for use according to the present invention has a rather low melt flow rate.

It is thus desired that the polypropylene composition used in the present invention has an MFR (230° C./2.16 kg) in the range of 5.0 to 80.0 g/10 min. More specifically, the polypropylene composition has an MFR (230° C./2.16 kg) in the range of 10.0 to 40.0 g/10 min. For example, the polypropylene composition has an MFR (230° C./2.16 kg) in the range of 10.0 to 30.0 g/10 min.

It is further preferred that the polypropylene composition used in the present invention has a good stiffness/impact balance. Accordingly it is appreciated that the polypropylene composition has a Charpy notched impact strength at +23° C. of at least 1.0 kJ/m$^2$, more preferably in the range of 1.0 to 55 kJ/m$^2$, still more preferably in the range of 2.0 to 25 kJ/m$^2$, like in the range of 2.0 to 20 kJ/m$^2$.

Additionally or alternatively, the tensile modulus of the polypropylene composition should be rather high. It is preferred that the tensile modulus of the polypropylene composition is in the range from 1200 to 2200 MPa, more preferably in the range of 1500 to 2000 MPa, still more preferably in the range of 1600 to 1900 MPa.

In the following the invention will be described in more detail.

Heterophasic Polypropylene Component (A)

The term heterophasic polypropylene is understood as known in the technical field. The heterophasic polypropylene (A) comprised in the polypropylene composition used in the present invention comprises a propylene homopolymer and an elastomeric propylene copolymer.

According to a preferred embodiment component (A) has an MFR (230° C./2.16 kg) in the range of 4.0 to 120.0 g/10 min.

In an equally preferred embodiment the MFR (230° C./2.16 kg) of component (A) is in the range of 8.0 to 35.0 g/10 min, still more preferably in the range of 10.0 to 30.0 g/10 min at 230° C.

The heterophasic polypropylene component (A) comprises apart from propylene comonomers such as ethylene and/or $C_4$ to $C_{12}$ α-olefins, in particular ethylene and/or $C_4$ to $C_{10}$ α-olefins, e.g. 1-butene and/or 1-hexene. Preferably the polypropylene component (A) comprises monomers copolymerizable with propylene from the group consisting of ethylene, 1-butene and 1-hexene. More specifically the heterophasic polypropylene component (A) comprises—apart from propylene—units derivable from ethylene and/or 1-butene. Thus in an especially preferred embodiment the heterophasic polypropylene component (A) comprise units derivable from ethylene and propylene only.

The amount of the xylene cold soluble (XCS) fraction of the heterophasic polypropylene component (A) is ≥10.0 wt %. According to a preferred embodiment the xylene cold soluble (XCS) fraction of the heterophasic polypropylene component (A) is in the range of 10.0 to 45.0 wt %, still more preferably is in the range of 10.0 to 35.0 wt %, like for example in the range of 13.0 to 35.0 wt %.

The comonomers of the xylene cold soluble (XCS) fraction of component (A) are the same as for the total heterophasic polypropylene component (A). Preferably the xylene cold soluble (XCS) fraction of component (A) comprises monomers copolymerizable with propylene from the group consisting of ethylene, 1-butene and 1-hexene. More specifically the xylene cold soluble (XCS) fraction of component (A) comprises—apart from propylene—units derivable from ethylene and/or 1-butene. Thus in an especially preferred embodiment the xylene cold soluble (XCS) fraction of component (A) comprises units derivable from ethylene and propylene only.

The heterophasic polypropylene component (A) used in the present invention is a heterophasic system with balanced comonomer/intrinsic viscosity (IV) ratio in the xylene cold soluble (XCS) fraction of the same.

Accordingly component (A) has an intrinsic viscosity (IV) of the xylene cold soluble (XCS) fraction determined according to DIN ISO 1628/1 (in Decalin at 135° C.) of >2.0 dl/g. Preferably the intrinsic viscosity (IV) of (XCS) of component (A) is in the range of 2.2 to 4.5 dl/g, more preferably in the range of 3.2 to 4.5 dl/g.

It is preferred that component (A) has a xylene cold soluble (XCS) fraction in the range of 10.0 to 45.0 wt % and an intrinsic viscosity (IV) of (XCS) of 2.1 to 4.5 dl/g, more preferably a xylene cold soluble (XCS) fraction in the range of 10.0 to 35.0 wt % and an intrinsic viscosity (IV) of (XCS) in the range of 2.2 to 4.5 dl/g, still more preferably a xylene cold soluble (XCS) fraction in the range of 13.0 to 35.0 wt % and an intrinsic viscosity (IV) of (XCS) in the range of 3.2 to 4.5 dl/g.

The expression "heterophasic polypropylene" as used in the instant invention indicates that an elastomeric propylene copolymer is (finely) dispersed in a (semi) crystalline polypropylene. In other words the (semi) crystalline polypropylene constitutes a matrix in which the elastomeric propylene copolymer forms inclusions in the matrix, i.e. in the (semi) crystalline polypropylene. Thus the matrix contains (finely) dispersed inclusions being not part of the matrix and said inclusions contain the elastomeric propylene copolymer. The term "inclusion" according to this invention shall preferably indicate that the matrix and the inclusion form different phases within the heterophasic system, said inclusions are for instance visible by high resolution microscopy, like electron microscopy or atomic force microscopy, or by dynamic mechanical thermal analysis (DMTA). Specifically in DMTA the presence of a multiphase structure can be identified by the presence of at least two distinct glass transition temperatures.

Accordingly the heterophasic polypropylene according to this invention comprises a propylene homopolymer acting as a matrix and dispersed therein an elastomeric propylene copolymer. Thus the matrix contains (finely) dispersed inclusions being not part of the matrix and said inclusions contain the elastomeric propylene copolymer.

The expression "propylene homopolymer" used in the instant invention relates to a polypropylene that consists substantially, i.e. of more than 99.5 wt %, still more preferably of at least 99.7 wt %, like of at least 99.8 wt %, of propylene units. In a preferred embodiment, only propylene units in the propylene homopolymer are detectable. The propylene homopolymer can be monomodal or multimodal, like bimodal, in its molecular weight fraction.

In case the propylene homopolymer is multimodal, like bimodal, in its molecular weight, it comprises at least two fractions, preferably consists of two fractions, the fractions are a first propylene homopolymer fraction and a second propylene homopolymer fraction. Preferably the two fractions differ in the melt flow rate MFR (230° C.).

The elastomeric propylene copolymer of the heterophasic polypropylene component (A) mainly influences the properties and amount of the xylene cold soluble (XCS) fraction of the heterophasic polypropylenes. Accordingly in a first approximation the properties of the elastomeric propylene copolymer can be equated with the properties of the xylene cold soluble (XCS) fraction of the heterophasic polypropylenes. However in preferred embodiments the amount of elastomeric propylene copolymer is higher than the total xylene cold soluble (XCS) content of the heterophasic polypropylene component (A). Accordingly the amount of the elastomeric copolymer of the heterophasic polypropylene component (A) corresponds to the content of the xylene cold soluble (XCS) fraction of the respective polypropylene.

The elastomeric propylene copolymer comprises monomers copolymerizable with propylene, for example comonomers such as ethylene and/or $C_4$ to $C_{12}$ α-olefins, in particular ethylene and/or $C_4$ to $C_{12}$ α-olefins, e.g. 1-butene and/or 1-hexene. Preferably the elastomeric propylene copolymer comprises, especially consists of, monomers copolymerizable with propylene from the group consisting of ethylene, 1-butene and 1-hexene. More specifically the elastomeric propylene copolymer comprises—apart from propylene—units derivable from ethylene and/or 1-butene. Thus in an especially preferred embodiment the elastomeric propylene copolymer phase comprises units derivable from ethylene and propylene only, i.e. is a propylene-ethylene rubber (EPR).

The heterophasic polypropylene component (A) may contain up to 5.0 wt % additives (including α-nucleating agents), like antioxidants and slip agents as well as antiblocking agents. Preferably the additive content is below 4.0 wt %, like below 3.0 wt %.

Suitable additives are well known in the art and can be found for example in the "Additives for Plastics" Handbook, J. Murphy, Elsevier, $2^{nd}$ edition, 2001.

The heterophasic polypropylene component (A) is preferably obtained by a sequential polymerization process where in the first reactor (1st R') and optionally in a second reactor (2nd R') the propylene homopolymer is produced, whereas in the third reactor and optionally in a fourth reactor the elastomeric propylene copolymer of the heterophasic polypropylene component is obtained.

The term "sequential polymerization process" indicates that the heterophasic polypropylene is produced in at least two polymerization reactors, preferably in three or four polymerization reactors, connected in series. Accordingly the present process comprises at least a first polymerization reactor, an optional second polymerization reactor, a third polymerization reactor and optional a fourth polymerization reactor. The term "polymerization reactor" shall indicate that the main polymerization takes place. Thus in case the process consists of three or four polymerization reactors, this definition does not exclude the option that the overall process comprises for instance a pre-polymerization step in a pre-polymerization reactor.

As stated above in the first or in the first two polymerization reactors the matrix, i.e. the propylene homopolymer is produced. In case two polymerization reactors are used for the preparation of the propylene homopolymer, in each polymerization reactor a propylene homopolymer fraction is produced which may differ in the melt flow rate.

After the first polymerization reactor or optional second polymerization reactor the matrix, i.e. the propylene homopolymer, of the heterophasic polypropylene component is obtained. This matrix is subsequently transferred into the third polymerization reactor and optional polymerization fourth reactor in which the elastomeric propylene copolymer is produced and thus the heterophasic polypropylene component used in the present invention is obtained.

The first polymerization reactor is preferably a slurry reactor and can be any continuous or simple stirred batch tank reactor or loop reactor operating in bulk or slurry. Bulk means a polymerization in a reaction medium that comprises of at least 60% (w/w) monomer. According to the present invention the slurry reactor is preferably a (bulk) loop reactor.

The second polymerization reactor, the third polymerization reactor and fourth polymerization reactor are preferably gas phase reactors. Such gas phase reactors can be any mechanically mixed or fluid bed reactors. Preferably the gas phase reactors comprise a mechanically agitated fluid bed reactor with gas velocities of at least 0.2 m/sec. Thus it is appreciated that the gas phase reactor is a fluidized bed type reactor preferably with a mechanical stirrer.

Thus in a preferred embodiment the first polymerization reactor is a slurry reactor, like loop reactor, whereas the second polymerization reactor, the third polymerization reactor and the optional fourth polymerization reactor are gas phase reactors. Accordingly for the instant process at least two, preferably two or three polymerization reactors, namely a slurry reactor, like loop reactor, a first gas phase reactor, a second gas phase reactor and optionally a third gas phase reactor connected in series are used. If needed prior to the slurry reactor a pre-polymerization reactor is placed.

A preferred multistage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

Heterophasic Polypropylene (B)

The heterophasic polypropylene (B) comprised in the polypropylene composition used in the present invention comprises a propylene homopolymer and an elastomeric propylene copolymer.

The expressions "heterophasic polypropylene", "propylene homopolymer", "elastomeric propylene copolymer" as generally defined under the above description of the heterophasic polypropylene (A) are valid also for the heterophasic polypropylene (B).

The heterophasic polypropylene component (B) comprises apart from propylene comonomers such as ethylene and/or $C_4$ to $C_{12}$ α-olefins, in particular ethylene and/or $C_4$ to $C_{10}$ α-olefins, e.g. 1-butene and/or 1-hexene. Preferably the polypropylene component (A) comprises monomers copolymerizable with propylene from the group consisting of ethylene, 1-butene and 1-hexene. More specifically the heterophasic polypropylene component (B) comprises—apart from propylene—units derivable from ethylene and/or 1-butene. Thus in an especially preferred embodiment the heterophasic polypropylene component (B) comprise units derivable from ethylene and propylene only.

According to a preferred embodiment the MFR (230° C./2.16 kg) of component (B) is >5.0 g/10 min, more preferably the MFR (230° C./2.16 kg) is in the range of above 5.0 to 55 g/10 min, still more preferably in the range of above 5.0 to 51 g/10 min.

The amount of the xylene cold soluble (XCS) fraction of the heterophasic polypropylene (B) preferably is below 35.0 wt %, more preferably below 32.0 wt %, still more preferably in the range of 11.0 to 35.0 wt %.

The comonomers of the xylene cold soluble (XCS) fraction of component (B) are the same as for the total heterophasic polypropylene component (B). Preferably the xylene cold soluble (XCS) fraction of component (B) comprises monomers copolymerizable with propylene from the group consisting of ethylene, 1-butene and 1-hexene. More specifically the xylene cold soluble (XCS) fraction of component (B) comprises—apart from propylene—units derivable from ethylene and/or 1-butene. Thus in an especially preferred embodiment the xylene cold soluble (XCS) fraction of component (B) comprises units derivable from ethylene and propylene only.

Additionally it is required that the molecular weight of the xylene cold soluble (XCS) fraction of the heterophasic polypropylene (B) is in a specific range. Accordingly in a preferred embodiment the xylene cold soluble (XCS) fraction of the heterophasic polypropylene (B) has an intrinsic viscosity (IV) determined according to DIN ISO 1628/1 (in Decalin at 135° C.) in the range of >5.0 dl/g, more preferably in the range of 6.0 to 12.0 dl/g.

The heterophasic polypropylene (B) may contain up to 5.0 wt % additives, like α-nucleating agents and antioxidants, as well as slip agents and antiblocking agents. Preferably the additive content is below 4.0 wt %, like below 3.0 wt %.

As a preferred example of the heterophasic polypropylene (B) comprised in the polypropylene composition used in the present invention reference is made to the tiger stripe modifier as described as heterophasic polypropylene composition (HECO1) in WO 2014/083130 A1. With regard to this composition (HECO1) WO 2014/083130 is hereby incorporated by reference in the instant invention.

The heterophasic polypropylene component (B) is preferably obtained by a sequential polymerization process like it is described above for the heterophasic polypropylene component (A).

A preferred multistage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

Filler (C)

A further essential component of the polypropylene composition used in the present invention is filler (C), which is preferably a mineral filler.

In a preferred embodiment the filler (C) is selected from the group consisting of talcum, wollastonite, caolin and mica. In one embodiment of the present invention, the filler (C) is talc.

The filler (C) preferably has a median particle size d50 in the range of 0.5 to 20.0 μm, more preferably in the range of 0.75 to 15.0 μm, still more preferably in the range of 0.75 to 10.0 μm.

Typically, the filler (C) has a cutoff particle size d95 [mass percent] of equal or below 30.0 μm, more preferably in the range from 1.5 to 30.0 μm, still more preferably in the range from 2.0 to 25.0 μm.

Additionally or alternatively, the filler (C) has a BET surface area in the range from 30 1.0 to 50.0 m$^2$/g, more preferably in the range from 5.0 to 40.0 m$^2$/g, still more preferably in the range from 10.0 to 30.0 m$^2$/g.

According to a preferred embodiment the filler component (C) is present in the polypropylene composition used in the instant invention in an amount of 5 to 25 wt %, more preferably in an amount of 5 to 20 wt %, still more preferably in an amount of 5 to 20 wt %, based on the total weight of the polypropylene composition.

Suitable fillers are well known in the art and can be found for example in the "Additives for Plastics" Handbook, J. Murphy, Elsevier, 2$^{nd}$ edition, 2001.

$C_2$-α-Olefin (D)

In a preferred embodiment the polypropylene composition further comprises (D) a $C_2$-α-Olefin having an MFR (190° C./2.16 kg)<0.5 g/10 min.

A $C_2$-α-Olefin compound within the meaning of the instant invention is a compound generally known as an elastomeric polyolefin or elastomer. It is usual to add ethylene/α-olefin elastomers to heterophasic polypropylene compositions in order to enhance their impact strength. However it is known in the art that elastomers have a negative influence on the surface appearance.

The elastomer can be any $C_2$-elastomeric polyolefin with the proviso that it chemically differs from the elastomeric propylene copolymer comprised in components (A) and (B).

The MFR of the $C_2$-α-Olefin elastomer which is used for the present invention is preferably selected—together with further properties described herein—to fine tune the impact properties of the polyolefin composition. It has been found that with an elastomer having a very low MFR (190° C./2.16 kg) of <0.5 g/10 min a good balance between mechanical properties and satisfying surface appearance properties can be achieved.

Preferably, the elastomer (D) comprises units derived from ethylene and a $C_4$ to $C_{20}$ α-olefin, more preferably comprises units derived from ethylene and a $C_4$ to $C_{10}$ α-olefin. For example the α-olefin is selected from the group consisting of 1-butene, 1-pentene, 1-hexene, 1-heptene and 1-octene.

According to a still more preferred embodiment the α-Olefin of component (D) is having 4 C-atoms, hence the elastomer is a $C_2$-Butene-elastomer.

It has surprisingly been found that with the addition of a $C_2$-Butene-elastomer the polypropylene composition used in the instant invention shows nearly no flowmarks while mechanical properties are excellent.

It is equally preferred that the elastomer (D) is a low density polyolefin, more preferably a very low density polyolefin polymerized using single site, preferably metallocene catalysis. According to an embodiment of the present invention, the ethylene-α-olefin elastomer has a density of from 860 to 881 kg/m$^3$.

In another preferred embodiment the intrinsic viscosity (IV) of (XCS) of component (D) is ≥2.0 dl/g, still more preferably is ≥2.1 dl/g.

It has been surprisingly found that with an intrinsic viscosity (IV) of (XCS) of the elastomer (D) of ≥2.0 dl/g not only the mechanical properties and the surface appearance of the polypropylene composition used in the instant invention are very good but that also the paint adhesion properties comply with the requirements.

The production of $C_2$-α-olefin elastomers is described in detail in: Chum S P, Kao C I 15 and Knight G W: Structure, properties and preparation of polyolefins produced by single-site technology. In: Metallocene-based Polyolefins—Volume 1, Scheirs J and Kaminsky W Eds, John Wiley and Sons Ltd, Chichester (West Sussex, England), 2000 pp. 262-264. Alternatively, $C_2$-α-olefin elastomers, which are commercially available and which fulfil the indicated requirements, can be used.

In a preferred embodiment elastomer (D) is present in the polypropylene composition used in the present invention in an amount of 10 to 20 wt % based on the total weight of the polypropylene composition. More preferably the amount of component (D) is in the range of 12 to 18 wt %, like for example is 15 wt % based on the total weight of the polypropylene composition.

In an especially preferred embodiment the polypropylene composition used in the present invention is comprising 40 to 70 wt % of component (A), 10 to 40 wt % of component (B), 5 to 25 wt % of component (C) and 10 to 20 wt % of component (D), based on the total weight of the final polypropylene composition. In a still more preferred embodiment the polypropylene composition is comprising 50 to 60 wt % of component (A), 15 to 30 wt % of component (B), 5 to 25 wt % of component (C) and 10 to 20 wt % of component (D), based on the total weight of the final polypropylene composition.

Articles and Uses According to the Invention

It is a feature of the present invention that the polypropylene composition as described above is used for the production of at least partially painted articles, whereupon the production of partially painted articles is preferred.

In doing so an improved paint adhesion of a preferably moulded article, more preferably of an injection moulded article is achieved. Preferably the polypropylene composition while keeping a good stiffness/impact balance is used to keep the average failed area, called delaminated area, which is a measure of paint adhesion, of (injection) moulded articles equal or below a certain value. Moreover the surface appearance properties measured as the Tigerskin value are also kept equal or below a certain value.

Thus according to a preferred embodiment of the invention the thus produced articles show a sum of the average delaminated area $DA_2$ (measured according to DIN 55662 Method C) and the average delaminated area $DA_3$ (measured according to DIN 55662 Method C) of ≤55.0 $mm^2$.

Likewise it is preferred that the thus produced articles show a Tigerskin value (measured according to PPS 25 Intern. Conf. Polym. Proc. Soc 2009 or Proceedings of the SPIE, Volume 6831, pp 68130T-68130T-8 (2008)) of ≤46.0, like for example of ≤22.0.

In an especially preferred embodiment of the invention the thus produced articles show a sum of the average delaminated area $DA_2$ (measured according to DIN 55662 Method C) and the average delaminated area $DA_3$ (measured according to DIN 55662 Method C) of ≤55.0 $mm^2$ and a Tigerskin value (measured according to PPS 25 Intern. Conf. Polym. Proc. Soc 2009 or Proceedings of the SPIE, Volume 6831, pp 68130T-68130T-8 (2008)) of ≤46.0.

In another preferred embodiment the sum of the average delaminated area $DA_2$ (measured according to DIN 55662 Method C) and the average delaminated area $DA_3$ (measured according to DIN 55662 Method C) of the articles is ≤30.0 $mm^2$, most preferably ≤5.0 $mm^2$, especially preferably ≤1.0 $mm^2$.

In an equally preferred embodiment the Tigerskin value (measured according to PPS 25 Intern. Conf. Polym. Proc. Soc 2009 or Proceedings of the SPIE, Volume 6831, pp 68130T-68130T-8 (2008)) of the produced articles is ≤25.0, more preferably ≤6.8.

According to an especially preferred embodiment the sum of the average delaminated area $DA_2$ (measured according to DIN 55662 Method C) and the average delaminated area $DA_3$ (measured according to DIN 55662 Method C) of the articles is ≤5.0 $mm^2$ and the Tigerskin value (measured according to PPS 25 Intern. Conf. Polym. Proc. Soc 2009 or Proceedings of the SPIE, Volume 6831, pp 68130T-68130T-8 (2008)) of the articles is ≤6.8.

As the thus received articles due to their excellent surface and paintability properties can be partially painted articles with a part of them remaining unpainted, they are suitable for many different technical application areas.

In an equally preferred embodiment the articles show an average delaminated area $DA_2$ (measured according to DIN 55662 Method C) of ≤1 $mm^2$ and a Tigerskin value (measured according to PPS 25 Intern. Conf. Polym. Proc. Soc 2009 or Proceedings of the SPIE, Volume 6831, pp 68130T-68130T-8 (2008)) of ≤6.8.

Those articles are especially preferred as they can be used in primerless 2-layer-paint systems.

In a further aspect the invention is directed to an at least partially painted article comprising a polypropylene composition as defined in the invention.

Preferably the article is a partially painted article where any desired ratio of painted to unpainted surface area of the article is possible. This ratio is closely related to the specific application area where the article shall be used.

In a preferred embodiment the article is an automotive article. Thus it is especially preferred that the polypropylene composition defined in the instant invention is used to improve paint adhesion and surface appearance of an injection moulded article such as an automotive article, i.e. of an exterior or interior automotive article. The term "automotive article" used in the instant invention indicates that it is a formed three-dimensional article for the interior or exterior of automotives typically made by injection moulding. Typical automotive articles are bumpers, side trims, step assists, body panels, rocker panels, spoilers, dash boards, interior trims and the like. The term "exterior" indicates that the article is not part of the car interior but part of the car's exterior. Accordingly, preferred exterior automotive articles are selected from the group consisting of bumpers, side trims, step assists, body panels, and spoilers. In contrast thereto, the term "interior" indicates that the article is part of the car interior but not part of the car's exterior. Accordingly, preferred interior automotive articles are selected from the group consisting of rocker panels, dash boards and interior trims.

Preferably the automotive article, i.e. the exterior automotive article, comprises equal or more than 80.0 wt %, more preferably equal or more than 90.0 wt %, yet more preferably equal or more than 95.0 wt %, still more preferably equal or more than 99.0 wt %, yet more preferably consists, of the polypropylene composition (C).

A further aspect of the present invention is a polypropylene composition comprising (B) a heterophasic polypropylene having an intrinsic viscosity (IV) of (XCS) >4.0 dl/g,
(D) a $C_2$-α-Olefin having an MFR (190° C./2.16 kg) <0.5 g/10 min and
(C) a filler
with the polypropylene composition having an intrinsic viscosity (IV) of (XCS) of ≥3.0 dl/g and a ratio of intrinsic viscosity (IV) of (XCS)/xylene cold soluble fraction (XCS) of ≥0.113 dl/g.

According to a preferred embodiment the polypropylene composition is further comprising
(A) a heterophasic polypropylene having a xylene cold soluble fraction (XCS) of ≥10.0 wt % and an intrinsic viscosity (IV) of (XCS) >2.0 dl/g.

The present invention will now be described in further detail by the examples provided below.

EXAMPLES

The following definitions of terms and determination methods apply for the above general description of the invention as well as to the below examples unless otherwise defined.

1. MEASURING METHODS

Xylene cold soluble (XCS) fraction is determined at 23° C. according to ISO 6427.

Intrinsic viscosity (IV) of (XCS) is measured according to DIN ISO 1628/1, October 1999 (in Decalin at 135° C.).

MFR (190° C./2.16 kg) is measured according to ISO 1133 (190° C., 2.16 kg load).

MFR (230° C./2.16 kg) is measured according to ISO 1133 (230° C., 2.16 kg load).

Tensile Modulus and elongation at break were measured according to ISO 527-2 (cross head speed=50 mm/min; 23° C.) using injection-molded specimens as described in (ISO 527-2:2012) (dog bone shape, 170×10×4 mm).

Charpy Impact Test: The Charpy notched impact strength (Charpy NIS) is measured according to ISO 1791eA/DIN 53453 at 23° C., and −20° C., using injection moulded bar test specimens of 80×10×4 $mm^3$ $mm^3$ prepared in accordance with ISO 294-1:1996.

Median particle size d50 (Sedimentation) is calculated from the particle size distribution 20 [mass percent] as determined by gravitational liquid sedimentation according to ISO 13317-3 (Sedigraph).

Cutoff particle size d95 (Sedimentation) is calculated from the particle size distribution 30 [mass percent] as determined by gravitational liquid sedimentation according to ISO 13317-3 (Sedigraph).

Surface area: BET with N2 gas according to DIN 66131/2, apparatus Micromeritics Tristar 3000: sample preparation at a temperature of 50° C., 6 hours in vacuum.

Surface Appearance/Tiger Skin Value

The tendency to show flow marks measured in the present invention in mean square error (MSE) was examined with a method as described below. This method is described in detail in WO 2010/149529, which is incorporated herein in its entirety.

An optical measurement system, as described by Sybille Frank et al. in PPS 25 Intern. Conf. Polym. Proc. Soc 2009 or Proceedings of the SPIE, Volume 6831, pp 68130T-68130T-8 (2008) was used for characterizing the surface quality.

This method consists of two aspects:
1. Image Recording:

The basic principle of the measurement system is to illuminate the plates with a defined light source (LED) in a closed environment and to record an image with a CCD-camera system.

2. Image Analysis:

The specimen is floodlit from one side and the upwards reflected portion of the light is deflected via two mirrors to a CCD-sensor. The thus created grey value image is analyzed in lines. From the recorded deviations of grey values the mean square error average (MSE) is calculated allowing a quantification of surface quality/homogeneity, i.e. the higher the MSE value the more pronounced is the surface defect.

Generally, for one and the same material, the tendency to flow marks and thus to higher MSE values increases when the injection speed is increased and hence the filling time is decreased.

The MSE values, called Tigerskin values were collected on injection-moulded plaques 440×148×2.8 mm produced with grain G1. The plaques were injection-moulded with different filling times of 1.5, 3 and 6 sec respectively.

Further Conditions:
Melt temperature: 240° C.
Mould temperature 30° C.
Dynamic pressure: 10 bar hydraulic Paint Adhesion/Paintability is characterized as the resistance of the pre-fabricated scratch template to pressure-water jetting according to DIN 55662 (Method C).

Injection moulded sample plates (150 mm×80 mm×2 mm) were cleaned with a mixture of isopropanol and water (1:1). Subsequently the surface was activated via flaming where a burner with a speed of 600 mm/s spreads a mixture of propane and air in a ratio of 1:23 with a flow rate of 150 l/h on the polymer substrate. Afterwards, the polymer substrate was coated with 2 layers of black paint, i.e. a base coat (Black BMW 668) and a clear coat (BMW 68895). The step of flaming was performed two times.

A steam of hot water with temperature T was directed for time t at distance d under angle α to the surface of the test panel. Pressure of the water jet results from the water flow rate and is determined by the type of nozzle installed at the end of the water pipe.

The following parameters were used:
T (water)=60° C.; t=60 s; d=130 mm, α=90°, water flow rate 11.3 l/min, nozzle type=MPEG 2506.

The adhesion was assessed by quantifying the failed or delaminated painted area per test line i.e. $DA_2$ (delaminated area for 2-layers painted systems) $DA_3$ (delaminated area for 3-layers painted systems). For each example 5 panels (150 mm×80 mm×2 mm) have been tested. The panels were produced by injection moulding with 240° C. melt temperature and 50° C. mold temperature. The flow front velocity during injection was 100 mm/s. On each panel certain lines were used to assess the paintability failure in [$mm^2$]. For this purpose, an image of the test point before and after steam jet exposure was taken. Then the delaminated area was calculated with an image processing software. The average delaminated area for 5 test lines on 5 test specimens (i.e. in total the average of 25 test points) was reported as average delaminated area.

2. EXAMPLES 2.1. Catalyst Preparation for Heterophasic Polypropylenes A1, A2, A4 and B Used in Inventive Examples IE1 to IE9 and in Comparative Examples CE2, CE3

First, 0.1 mol of $MgCl_2×3$ EtOH was suspended under inert conditions in 250 ml of decane in a reactor at atmospheric pressure. The solution was cooled to the temperature of −15° C. and 300 ml of cold TiCl$_4$ were added while maintaining the temperature at said level. Then, the temperature of the slurry was increased slowly to 20° C. At this temperature, 0.02 mol of dioctylphthalate (DOP) was added to the slurry. After the addition of the phthalate, the temperature was raised to 135° C. over a period of 90 minutes and subsequently the slurry was allowed to stand for 60 minutes. Then, another 300 ml of TiCl$_4$ were added and the temperature was kept at 135° C. for 120 minutes. After this, the catalyst was filtered from the liquid and washed six times with 300 ml heptane at 80° C. Then, the solid catalyst component was filtered and dried. The catalyst and its preparation concept is described in general e.g. in patent publications EP 491566, EP 591224 and EP 586390.

The catalyst was further modified (VCH modification of the catalyst) as described in EP 2960256A1. 52 ml of mineral oil (Paraffinum Liquidum PL68) was added to a 125 ml stainless steel reactor followed by 1.17 g of triethyl aluminium (TEAL) and 0.73 g of dicyclopentyl dimethoxy silane (D-donor) under inert conditions at room temperature. After 10 minutes, 5.0 g of the catalyst prepared above (Ti content 1.8 wt.-%) was added, and after additional 20 minutes 5.0 g of vinylcyclohexane (VCH) was added. The respective processes are described in EP 1028984, EP 1183307 and EP 591224.

2.2. Catalyst Preparation for Heterophasic Polypropylene A3 Used in Comparative Example CE1

80 mg of ZN104-catalyst of LyondellBasell is activated for 5 minutes with a mixture of Triethylaluminium (TEAL; solution in hexane 1 mol/l) and Dicyclopentyldimethoxysilane as donor (0.3 mol/l in hexane)—in a molar ratio of 18.7 (Co/ED) after a contact time of 5 min and 10 ml hexane in a catalyst feeder. The molar ratio of TEAL and Ti of catalyst is 220 (Co/TC)). After activation the catalyst is spilled with 250 g propylene into the stirred reactor with a temperature of 23° C. Stirring speed is hold at 250 rpm. After 6 min prepolymersation at 23° C. the polymerization starts as indicated in table 1.

2.3. Preparation of Heterophasic Polypropylenes A1 to A4 Used in Examples IE1 to IE3, IE5 to IE9, CE1 to CE3 and of Heterophasic Polypropylene B Used in Examples IE1, IE4 to IE8, CE3

A Borstar PP pilot plant comprised of a stirred-tank prepolymerization reactor, a liquid-bulk loop reactor and three gas phase reactors (GPR1 to GPR3) was used for the main polymerization.

The polymerization conditions of the heterophasic polypropylenes A1 to A4 and B used in inventive Examples IE1 to IE9 and in comparative Examples CE1 to CE3 are shown in Tables 1 and 2.

TABLE 1

Polymerization conditions of the heterophasic polypropylenes A1 to A4 of IE1 to IE3, IE5 to IE9, CE1 to CE3

| | | A1 IE1, IE2, IE9 | A2 IE3, IE5, IE6, | A3 CE1 | A4 IE1, IE7, IE8, IE9, CE2, CE3 |
|---|---|---|---|---|---|
| Donor | | DCPDMS | DCPDMS | | DCPDMS |
| Cocatalyst | | TEAL | TEAL | TEAL | TEAL |
| Co/ED ratio | [mol/mol] | 7.3 | 10.0 | 18 | 10 |
| Co/TC ratio | [mol/mol] | 220 | 205 | 220 | 220 |
| Prepolymerization | | | | | |
| Residence time | [h] | 0.08 | 0.09 | 0.1 | 0.08 |
| Temperature | [° C.] | 30 | 30 | 30 | 30 |
| Matrix (PM1) Loop Reactor (LR) | | | | | |
| Split | [wt %] | 39 | 29 | 32.5 | 52 |
| Temperature | [° C.] | 72 | 72 | 70 | 75 |
| Pressure | [kPa] | 5633 | 5532 | 5355 | 5530 |
| H2/C3 | [mol/kmol] | 14.8 | 21 | 14 | 22 |
| MFR | [g/10 min] | 55 | 120 | 35 | 160 |
| Matrix (PM1) 1st Gas Phase Reactor (GPR1) | | | | | |
| Split | [wt %] | 26 | 36 | 34.5 | 34 |
| Temperature | [° C.] | 80 | 85 | 78 | 80 |
| Pressure | [kPa] | 2231 | 2500 | 2214 | 2200 |
| H2/C3 | [mol/kmol] | 150 | 204 | 78 | 175 |
| MFR | [g/10 min] | 55 | 120 | 35 | 160 |
| Elastomer (EPR1) 2nd Gas Phase Reactor (GPR2) | | | | | |
| Split | [wt %] | 20 | 22 | 21 | 14 |
| Temperature | [° C.] | 70 | 75 | 71 | 80 |
| Pressure | [kPa] | 2201 | 2000 | 2202 | 2190 |
| H2/C2 ratio | [mol/kmol] | 116 | 84.75 | 219 | 250 |
| C2/C3 ratio | [mol/kmol] | 584 | 701 | 715 | 550 |
| C2 | [mol %] | 12.2 | 10.8 | 12 | 11.5 |
| MFR | [g/10 min] | 20 | 40 | 12 | 95 |
| XCS | wt % | 20 | 18 | 19 | 15 |

TABLE 1-continued

Polymerization conditions of the heterophasic polypropylenes
A1 to A4 of IE1 to IE3, IE5 to IE9, CE1 to CE3

|  |  | A1<br>IE1, IE2,<br>IE9 | A2<br>IE3, IE5,<br>IE6, | A3<br>CE1 | A4<br>IE1, IE7,<br>IE8, IE9,<br>CE2, CE3 |
|---|---|---|---|---|---|
| Elastomer (EPR1)<br>3rd Gas Phase<br>Reactor (GPR3) |  |  |  |  |  |
| Temperature | [° C.] | 85 | 85 | 83 | n.a. |
| Pressure | [kPa] | 1421 | 1400 | 1383 | n.a. |
| C2/C3 ratio | [mol/kmol] | 585.2 | 699 | 747 | n.a. |
| H2/C2 ratio | [mol/kmol] | 92.7 | 129 | 203 | n.a. |
| MFR | [g/10 min] | 11 | 24 | 13 | n.a. |
| split | [wt %] | 15 | 13 | 12 | 0 |
| XCS | [wt %] | 32.5 | 29 | 31 | n.a. | wt % based on the weight of the heterophasic polypropylene (A)
DCPDMS Dicyclopentyldimethoxysilane
TEAL Triethylaluminium
MFR Melt flow rate at 230° C.
H2/C3 Molar ratio of hydrogen to propylene
C2/C3 Molar ratio of ethylene to propylene
H2/C2 Molar ratio of hydrogen to ethylene

TABLE 2

Polymerization conditions of the heterophasic
polypropylene B of IE1, IE4 to IE8, CE3

|  |  | B<br>IE1, IE4,<br>IE5, IE6,<br>IE7, IE8,<br>CE3 |
|---|---|---|
| Donor |  | DCPDMS |
| Cocatalyst |  | TEAL |
| Co/ED ratio | [mol/mol] | 10 |
| Co/TC ratio | [mol/mol] | 200 |
| Prepolymerization |  |  |
| Residence time | [h] | 0.26 |
| Temperature | [° C.] | 30 |
| Matrix (PM1)<br>Loop Reactor (LR) |  |  |
| Split | [wt %] | 35 |
| Temperature | [° C.] | 76 |
| Pressure | [kPa] | 5633 |
| H2/C3 | [mol/kmol] | 25 |
| MFR | [g/10 min] | 160 |
| Matrix (PM1)<br>1st Gas Phase<br>Reactor (GPR1) |  |  |
| Split | [wt.-%] | 40 |
| Temperature | [° C.] | 80 |
| Pressure | [kPa] | 2400 |
| H2/C3 | [mol/kmol] | 45 |
| MFR2 | [g/10 min] | 55 |
| Elastomer (EPR1)<br>2nd Gas Phase<br>Reactor (GPR2) |  |  |
| Split | [wt %] | 15 |
| Temperature | [° C.] | 67 |
| Pressure | [kPa] | 2100 |
| H2/C2 ratio | [mol/kmol] | 23 |
| C2/C3 ratio | [mol/kmol] | 242 |
| C2 | [mol %] | 10 |
| MFR | [g/10 min] | 20 |
| XCS | [wt %] | 18 |
| Elastomer (EPR1)<br>3rd Gas Phase<br>Reactor (GPR3) |  |  |
| Temperature | [° C.] | 67 |
| Pressure | [kPa] | 1500 |
| C2/C3 ratio | [mol/kmol] | 250 |
| H2/C2 ratio | [mol/kmol] | 22 |
| MFR | [g/10 min] | 5.5 |
| split | [wt %] | 10 |
| XCS | [wt %] | 25 | wt % based on the weight of the heterophasic polypropylene B

TABLE 3

Properties of the heterophasic polypropylenes A1 to A4 and
B of IE1 to IE9 and CE1 to CE3

|  |  | A1<br>IE1,<br>IE2,<br>IE9 | A2<br>IE3, IE5,<br>IE6 | A3<br>CE1 | A4<br>IE1, IE7,<br>IE8, IE9,<br>CE2, CE3 | B<br>IE1, IE4,<br>IE5, IE6,<br>IE7, IE8,<br>CE3 |
|---|---|---|---|---|---|---|
| MFR | [g/10 min] | 11 | 24 | 13 | 95 | 5.5 |
| XCS | [wt %] | 32.5 | 29 | 31 | 15 | 25 |
| IV (XCS) | [dl/g] | 3.3 | 3.2 | 2.2 | 2.3 | 7.0 |

TABLE 4

Properties of $C_2$ α-Olefin component D of IE8
and of propylene homopolymer component X of IE9

|  |  | D IE8 | X IE9 |
|---|---|---|---|
| MFR | [g/10 min] | 0.46 | 8 |
| XCS | [wt %] | 19 | 2.8 |
| IV (XCS) | [dl/g] | 2.1 | 1.8 |

2.4. Preparation of Polypropylene Composition Comprising Heterophasic Polypropylenes A1 to A4 and/or B Used in Inventive Examples IE1 to IE9 and in Comparative Examples CE1 to CE3

The compositions were prepared via melt blending on a co-rotating twin screw extruder with 0.1 wt.-% of Songnox 1010FF (Pentaerythrityl-tetrakis(3-(3',5'-di-tert. butyl-4-hydroxyphenyl)), 0.1 wt.-% Kinox-68 G (Tris (2,4-di-t-butylphenyl) phosphite) from HPL Additives, 0.2 wt % glycerin monostearate. The polymer melt mixture was discharged and pelletized.

The constituents of the polypropylene compositions used in inventive Examples IE1 to IE9 and in comparative Examples CE1 to CE3 are shown in Tables 5 and 6.

The properties of the polypropylene compositions used in inventive Examples IE1 to IE9 and in comparative Examples CE1 to CE3 are shown in Tables 7 and 8.

TABLE 5

Constituents of polypropylene compositions of inventive Examples IE1 to IE9

|  |  | IE1 | IE2 | IE3 | IE4 | IE5 | IE6 | IE7 | IE8 | IE9 |
|---|---|---|---|---|---|---|---|---|---|---|
| A1 | [wt %] | 47 | 87 |  |  |  |  |  |  | 47 |
| A2 | [wt %] |  |  | 87 |  | 67 | 57 |  |  |  |
| A3 |  |  |  |  |  |  |  |  |  |  |
| A4 |  |  | 20 |  |  |  |  | 47 | 47 | 20 |
| B | [wt %] | 20 |  |  | 87 | 20 | 20 | 40 | 15 |  |
| D | [wt %] |  |  |  |  |  |  |  | 15 |  |
| X | [wt %] |  |  |  |  |  |  |  |  | 20 |
| C | [wt %] | 10 | 10 | 10 | 10 | 10 | 20 | 10 | 20 | 10 |
| Additivation | [wt %] | 3 | 3 | 3 | 3 | 3 | 3 | 3 | 3 | 3 |

TABLE 6

Constituents of polypropylene compositions of comparative Examples CE1 to CE3

|  |  | CE1 | CE2 | CE3 |
|---|---|---|---|---|
| A3 | [wt %] | 87 |  |  |
| A4 | [wt %] |  | 87 | 47 |
| B | [wt %] |  |  | 15 |
| Engage HM7467 | [wt %] |  |  | 15 |
| C | [wt %] | 10 | 10 | 20 |
| Additivation | [wt %] | 3 | 3 | 3 | wt % is based on the weight of the final polypropylene composition.

Component D of IE8 is the commercial ethylene-butene copolymer Engage HM 7487 by Dow having a density of 0.860 g/cm3, a melt flow rate MFR (190° C., 2.16 kg) of 0.26 g/10 min, a MFR (230° C., 2.16 kg) of 0.46 g/10 min and a 1-butene content of 19.1 mol %.

Engage HM 7467 of CE3 is the commercial ethylene-butene copolymer Engage HM 7467 by Dow having a density of 0.862 g/cm3, a melt flow rate MFR (190° C., 2.16 kg) of 1.18 g/10 min, a MFR (230° C., 2.16 kg) of 2.4 g/10 min and a 1-butene content of 18.1 mol %.

Component X of IE9 is the commercial product HD120 MO by Borealis, a propylene homopolymer grade with MFR (230° C.) of 8.0 g/10 min.

Component C is the commercial talc Steamic T1 CA of Luzenac having a mean particle size $d_{50}$ of 2.1 μm (Sedigraph of compacted talc).

TABLE 7

Properties of the Polypropylene compositions of inventive Examples IE1 to IE9

|  |  | IE1 | IE2 | IE3 | IE4 | IE5 | IE6 | IE7 | IE8 | IE9 |
|---|---|---|---|---|---|---|---|---|---|---|
| XCS | [wt %] | 23.3 | 28.3 | 25.2 | 21.8 | 24.4 | 21.5 | 17.0 | 25.8 | 18.3 |
| IV(XCS) | [dl/g] | 4.2 | 3.5 | 3.1 | 6.0 | 3.7 | 3.8 | 4.5 | 3.5 | 3.3 |

TABLE 7-continued

Properties of the Polypropylene compositions of inventive Examples IE1 to IE9

|  |  | IE1 | IE2 | IE3 | IE4 | IE5 | IE6 | IE7 | IE8 | IE9 |
|---|---|---|---|---|---|---|---|---|---|---|
| MFR | [g/10 min] | 15.98 | 11.4 | 21.0 | 6.7 | 16.0 | 14.32 | 26.4 | 19.0 | 17.0 |
| Tensile Modulus | [MPa] | 1676 | 1440 | 1433 | 1601 | 1503 | 2063 | 1882 | 1861 | 1835 |
| Elongation at break |  | 43.0 | 56.0 | 38.0 | 403 | 56.47 | 40.55 | 35.43 | 49.32 | 40.2 |
| Charpy ISO1791eA; +23° C. | [kJ/m$^2$] | 12.13 | 20.5 | 13.1 | 50.4 | 14.45 | 10.99 | 7.91 | 19.70 | 8.0 |
| IV(XCS)/XCS DA$_2$ |  | 0.180 | 0.124 | 0.123 | 0.275 | 0.152 | 0.177 | 0.265 | 0.136 | 0.180 |
| average DA$_3$ | [mm$^2$] | 0 | 0 | 0 | 0 | 0 | 0 | 0 | 1 | 0 |
| average Tigerskin value | [mm$^2$] | 0.8 | 0 | 0 | 0 | 0 | 0 | 0 | 29 | 0 |
| 1.5 sec |  | 6.10 | 21.8 | 5.9 | 4.3 | 5.6 | 5.5 | 5.3 | 6.8 | 45.1 |
| 3 sec |  | 3.9 | 45.9 | 3.1 | 3.6 | 3.3 | 5.5 | 3.3 | 5.0 | 14.0 |
| 6 sec |  | 2.8 | 4.7 | 4.9 | 4.1 | 2.6 | 3.3 | 2.7 | 3.7 | 3.7 |

TABLE 8

Properties of the polypropylene composition of comparative Examples CE1 to CE3

|  |  | CE1 | CE2 | CE3 |
|---|---|---|---|---|
| XCS | [wt %] | 26.9 | 13 | 25.8 |
| IV(XCS) | [dl/g] | 2.0 | 2.3 | 2.9 |
| MFR | [g/10 min] | 12.2 | 80.2 | 23.6 |
| Tensile Modulus | [MPa] | 1303 | 2063 | 1785 |
| Elongation at break |  | 420 | 5.5 | 58.4 |
| Charpy ISO1791eA; +23° C. | [kJ/m$^2$] | 25.1 | 3.2 | 30 |
| IV(XCS)/XCS DA$_2$ |  | 0.074 | 0.177 | 0.112 |
| average DA$_3$ | [mm$^2$] | 29 | 0 | 58 |
| average Tigerskin value | [mm$^2$] | 29 | 139 | 83 |
| 1.5 sec |  | 85.7 | 6.9 | 6.8 |
| 3 sec |  | 51.1 | 3.4 | 6.5 |
| 6 sec |  | 20.4 | 3.2 | 5.2 |

The polypropylene compositions of Inventive Examples IE2, IE3 and IE9 of Table 7 comprise at least one component A, whereupon the composition of IE9 in addition to two different A components A1 and A4 also comprises a propylene homopolymer X with an intrinsic viscosity (IV) of (XCS) of <2 dl/g. Table 7 shows that those compositions even without containing component (B) achieve very good paintability values as long as the intrinsic viscosity (IV) and the IV (XCS)/XCS ratio are within the ranges specified in present claim 1. Paintability requirements for both the two layer and the three layer system are certainly fulfilled. Moreover there can additionally be achieved excellent surface appearance values as e.g. shown in example IE3. Accordingly such compositions can be used both for fully and for partially painted articles. In comparison to that as is derivable from Table 8, the compositions of Comparative Examples CE1 and CE2 which also contain only components A3 and A4 but don't contain component B do not show the required paintability values. Those compositions do not comprise the IV (XCS) and IV (XCS)/XCS features of present claim 1. Articles made of those compositions are thus not suitable for being painted optionally with the two—or with the three layer system.

From a comparison of IE9 with IE1 of Table 7 it can be seen that in addition to the excellent paintability values achievable even with a homopolymer component having a low intrinsic viscosity IV (XCS), the surface appearance of the final polypropylene composition clearly improves if instead of the homopolymer component X the heterophasic polypropylene component B is used. The thus obtained articles containing both component A and component B are suitable both for fully and for partially painted articles.

Similarly compositions IE5, IE6 and IE7 shown in Table 7 comprise both component A and component B and having IV and IV/XCS values according to present claim 1. They also show both very good paintability and surface appearance properties. Moreover IE7 shows that an excessively high IV (XCS)/XCS ratio does not result in any further advantage in the paintability and surface appearance properties compared to a composition such as in IE6 with some lower IV (XCS)/XCS ratio which of course is still within the limits given in present claim 1.

The composition shown in IE8 of Table 7 comprises component D with a low MFR value of <0.5 g/10 min as specified in claim 12 of the present invention. This results in very good mechanical properties, as for example both impact strength (Charpy) and Tensile Modulus of the final polypropylene composition are as required. Surprisingly such compositions in addition to a good surface appearance show acceptable paintability values. This seems mainly due to the fact that component D of IE8 is a branched Elastomer. In comparison to that, the results of the composition of CE3 which is composed of the same constituents as the one of IE8 except that instead of the branched elastomer an unbranched elastomer is used are clearly worse. Actually the unbranched elastomer of CE3 shows an MFR >0.5 g/10 min and results in good mechanical properties of the final composition but both paintability and surface appearance values are not satisfying.

The invention claimed is:

1. A method comprising producing at least partially painted articles from a polypropylene composition comprising
   (A) a heterophasic polypropylene having a xylene cold soluble fraction (XCS) of 10.0 to 45 wt % and an intrinsic viscosity (IV) of the xylene cold soluble (XCS) fraction of 2.1 to 4.5 dl/g,
   (B) a heterophasic polypropylene having an intrinsic viscosity (IV) of (XCS) >5.0 dl/g,
   (C) a filler, and
   (D) a $C_2$-α-Olefin having a MFR (190° C./2.16 kg) <0.5 g/10 min, with the polypropylene composition having an intrinsic viscosity (IV) of (XCS) of >3.0 dl/g and a ratio of intrinsic viscosity (IV) of (XCS)/xylene cold soluble fraction (XCS) of >0.113 dl/g.

2. The method according to claim 1 wherein in the polypropylene composition component (A) is present in an amount of 40 to 80 wt % and component (B) is present in an amount of 10 to 50 wt %, based on a total weight of the polypropylene composition.

3. The method according to claim 1 wherein component (B) is present in the polypropylene composition in an amount of 10 to 40 wt % based on the total weight of the polypropylene composition.

4. The method according to claim 1 wherein the polypropylene composition has an MFR (230° C./2.16 kg) in the range of 5.0 to 80 g/10 min.

5. The method according to claim 1 wherein component (A) has an MFR (230° C. 2.16 kg) of 4.0 to 120 g/10 min.

6. The method according to claim 1 wherein the intrinsic viscosity (IV) of (XCS) of component (A) is in the range of 2.2 to 4.5 dl/g.

7. The method according to claim 1 wherein the MFR (230° C./2.16 kg) of component (B) is >5.0 g/10 min.

8. The method according to claim 1 wherein the intrinsic viscosity (IV) of (XCS) of component (B) is in a range of 6.0 to 12.0 dl/g.

9. The method according to claim 1 wherein component (C) is present in the polypropylene composition in an amount of 5 to 25 wt % based on the total weight of the polypropylene composition.

10. The method according to claim 1 wherein the $C_2$-a-Olefin of component (D) is having 4 C-atoms.

11. The method according to claim 1 wherein the intrinsic viscosity (IV) of (XCS) of component (D) is >2.0 dl/g.

12. The method according to claim 1 wherein component (D) is present in an amount of 10 to 20 wt % based on the total weight of the polypropylene composition.

13. The method according to claim 1 wherein the polypropylene composition is comprising 40 to 70 wt % of component (A), 10 to 40 wt % of component (B) 5 to 25 wt % of component (C) and 10 to 20 wt % of component (D), based on the total weight of the final polypropylene composition.

14. The method according to claim 1 wherein the at least partially painted articles show
   a sum of the average delaminated area $DA_2$ (measured according to DIN 55662 Method C) and the average delaminated area $DA_3$ (measured according to DIN 55662 Method C) of <55.0 $mm_2$.

15. The method according to claim 14 wherein the at least partially painted articles show a Tigerskin value (measured according to PPS 25 Intern. Conf. Polym. Proc. Soc 2009 or Proceedings of the SPIE, Volume 6831, pp 68130T-68130T-8 (2008)) of <46.0.

16. The method according to claim 1 wherein the at least partially painted articles show an average delaminated area $DA_2$ (measured according to DIN 55662 Method C) of <1 $mm^2$ and a Tigerskin value (measured according to PPS 25 Intern. Conf. Polym. Proc. Soc 2009 or Proceedings of the SPIE, Volume 6831, pp 68130T- 68130T-8 (2008)) of <6.8.

17. At least partially painted article comprising a polypropylene composition comprising
   (A) a heterophasic polypropylene having a xylene cold soluble fraction (XCS) of 10.0 to 45 wt % and an intrinsic viscosity (IV) of the xylene cold soluble (XCS) fraction of 2.1 to 4.5 dl/g,
   (B) a heterophasic polypropylene having an intrinsic viscosity (IV) of (XCS) >5.0 dl/g,
   (C) a filler, and
   (D) a C2-α-Olefin having a MFR (190° C./2.16 kg) <0.5 g/10 min,
   with the polypropylene composition having an intrinsic viscosity (IV) of (XCS) of >3.0 dl/g and a ratio of intrinsic viscosity (IV) of (XCS)/xylene cold soluble fraction (XCS) of >0.113 dl/g.

18. The at least partially painted article according to claim 17 with the at least partially painted article being an automotive article.

19. Polypropylene composition comprising
   (A) a heterophasic polypropylene having a xylene cold soluble fraction (XCS) of 10.0 to 45 wt % and an intrinsic viscosity (IV) of (XCS) of 2.1 to 4.5 dl/g,
   (B) a heterophasic polypropylene having an intrinsic viscosity (IV) of (XCS) >5.0 dl/g,
   (C) a filler, and
   (D) a $C_2$-a-Olefin having an MFR (190° C./2.16 kg) <0.5 g/10 min
   with the polypropylene composition having an intrinsic viscosity (IV) of (XCS) of >3.0 dl/g and a ratio of intrinsic viscosity (IV) of (XCS)/xylene cold soluble fraction (XCS) of >0.113 dl/g.

20. At least partially painted article comprising a polypropylene composition comprising
   (A) a heterophasic polypropylene having a xylene cold soluble fraction (XCS) of 10.0 to 45 wt % and an intrinsic viscosity (IV) of the xylene cold soluble (XCS) fraction of 2.1 to 4.5 dl/g,
   (B) a heterophasic polypropylene having an intrinsic viscosity (IV) of (XCS) >5.0 dl/g, and
   (C) a filler
   wherein the polypropylene composition has an intrinsic viscosity (IV) of (XCS) of >3.0 dl/g and a ratio of intrinsic viscosity (IV) of (XCS)/xylene cold soluble fraction (XCS) of >0.113 dl/g, and
   wherein the at least partially painted articles show
      a sum of the average delaminated area $DA_2$ (measured according to DIN 55662 Method C) and the average delaminated area $DA_3$ (measured according to DIN 55662 Method C) of <55.0 $mm^2$.

* * * * *